United States Patent
Butler et al.

(10) Patent No.: US 8,970,959 B2
(45) Date of Patent: Mar. 3, 2015

(54) STEREOSCOPIC BEAM SPLITTER

(71) Applicant: Endure Medical, Inc., Cumming, GA (US)

(72) Inventors: Jonathan M. Butler, Gainesville, GA (US); Robert T. Hewlett, Cumming, GA (US); Steven M. Frank, Suwanee, GA (US)

(73) Assignee: Endure Medical, Inc., Cumming, GA (US)

( * ) Notice: Subject to any disclaimer, the term of this patent is extended or adjusted under 35 U.S.C. 154(b) by 0 days.

(21) Appl. No.: 13/862,792

(22) Filed: Apr. 15, 2013

(65) Prior Publication Data

US 2013/0271845 A1  Oct. 17, 2013

Related U.S. Application Data

(60) Provisional application No. 61/625,607, filed on Apr. 17, 2012.

(51) Int. Cl.
*G02B 27/14* (2006.01)
*G02B 27/10* (2006.01)

(52) U.S. Cl.
USPC .......................................... 359/629; 359/618

(58) Field of Classification Search
USPC ................... 359/629–634, 646, 618
See application file for complete search history.

(56) References Cited

U.S. PATENT DOCUMENTS

| | | | |
|---|---|---|---|
| 4,544,243 A | 10/1985 | Munnerlyn | |
| 7,001,018 B1 | 2/2006 | Martin | |
| 7,230,763 B2 * | 6/2007 | Brasen et al. | 359/618 |
| 7,349,157 B2 * | 3/2008 | Le Hors et al. | 359/257 |
| 7,375,896 B2 * | 5/2008 | Huang | 359/634 |
| 2003/0081322 A1 | 5/2003 | De Vaan et al. | 359/634 |
| 2004/0070820 A1 | 4/2004 | Nishimura | 359/629 |
| 2004/0075902 A1 | 4/2004 | Sano et al. | 359/495 |
| 2004/0227989 A1 | 11/2004 | Obrebski et al. | 359/388 |
| 2004/0252371 A1 | 12/2004 | Sturgis et al. | 455/500 |
| 2005/0277913 A1 | 12/2005 | McCary | |
| 2007/0002437 A1 | 1/2007 | Spink et al. | 359/376 |
| 2008/0121786 A1 | 5/2008 | Shoavi | 359/618 |

FOREIGN PATENT DOCUMENTS

| | | |
|---|---|---|
| EP | 1120676 A2 | 8/2001 |
| EP | 1120686 A2 | 8/2001 |
| WO | 0127659 A2 | 4/2001 |

* cited by examiner

*Primary Examiner* — Mohammed Hasan

(57) ABSTRACT

According to certain embodiments, a system includes beamsplitter sets, where each beamsplitter set comprises a first beamsplitter module and a second beamsplitter module aligned with the first beamsplitter module. The first beamsplitter module receives a first beam traveling along a first optical path. The first beamsplitter module splits the first beam into a first output beam transmitted along the first optical path and a first split beam transmitted to the second beamsplitter module along a reflected beam path. The second beamsplitter module receives the first split beam. The second beamsplitter module splits the first split beam into a second output beam transmitted substantially parallel to the reflected beam path and a second split beam transmitted substantially perpendicular to the reflected beam path.

11 Claims, 4 Drawing Sheets

STEREOSCOPIC BEAM SPLITTER

RELATED APPLICATION

This application claims benefit under 35 U.S.C. §119(e) of U.S. Provisional Application Ser. No. 61/625,607, entitled "STEREOSCOPIC BEAM SPLITTER," filed Apr. 17, 2012, which is incorporated herein by reference.

TECHNICAL FIELD

The present disclosure relates generally to light beam splitting, and more particularly to stereoscopic beam splitters.

BACKGROUND

A microscope receives a light beam from a target to yield an image of the target. In certain microscopes, the light beam may be split or combined with other beams. For example, the light beam may be split to yield split beams. The split beams can be sent to different destinations for different uses, e.g., to one or more eye pieces for viewing by one or more users and/or to a camera for recording. As another example, the light beam may be combined with another light beam to combine images. For example, a target image may be overlapped with an image providing information about microscope parameters.

BRIEF SUMMARY

According to certain embodiments, a system includes beamsplitter sets, where each beamsplitter set comprises a first beamsplitter module and a second beamsplitter module aligned with the first beamsplitter module. The first beamsplitter module receives a first beam traveling along a first optical path. The first beamsplitter module splits the first beam into a first output beam transmitted along the first optical path and a first split beam transmitted to the second beamsplitter module along a reflected beam path. The second beamsplitter module receives the first split beam. The second beamsplitter module splits the first split beam into a second output beam transmitted substantially parallel to the reflected beam path and a second split beam transmitted substantially perpendicular to the reflected beam path.

According to certain embodiments, a method includes receiving a light beams at beamsplitter sets, where each beamsplitter set comprises a first beamsplitter module and a second beamsplitter module aligned with the first beamsplitter module. A first beam traveling along a first optical path is received at the first beamsplitter module. The first beam is split by the first beamsplitter module into a first output beam transmitted along the first optical path and a first split beam transmitted to the second beamsplitter module along a reflected beam path. The first split beam is received at the second beamsplitter module. The first split beam is split by the second beamsplitter module into a second output beam transmitted substantially parallel to the reflected beam path and a second split beam transmitted substantially perpendicular to the reflected beam path.

According to certain embodiments, a system includes beamsplitter sets, where each beamsplitter set comprises a first beamsplitter module and a second beamsplitter module aligned with the first beamsplitter module. The first beamsplitter module receives a first beam traveling along a first optical path. The first beamsplitter module splits the first beam into a first output beam transmitted along the first optical path and a first split beam transmitted to the second beamsplitter module along a reflected beam path. The second beamsplitter module receives the first split beam and transmits the first split beam substantially parallel to the reflected beam path line. The second beamsplitter module receives a second beam and transmits the second beam to the first beamsplitter module. The first beamsplitter module further receives the second beam and transmits the second beam along the first optical path.

According to certain embodiments, a method includes receiving light beams at beamsplitter sets, where each beamsplitter set comprises a first beamsplitter module and a second beamsplitter module aligned with the first beamsplitter module. A first beam traveling along a first optical path is received at the first beamsplitter module. The first beam is split by the first beamsplitter module into a first output beam transmitted along the first optical path and a first split beam transmitted to the second beamsplitter module along a reflected beam path. The first split beam is transmitted by the second beamsplitter module substantially parallel to the reflected beam path line. A second beam is transmitted by the second beamsplitter module to the first beamsplitter module. The second beam is transmitted by the first beamsplitter module along the first optical path.

BRIEF DESCRIPTION OF THE DRAWINGS

Exemplary embodiments of the present disclosure will now be described by way of example in greater detail with reference to the attached figures, in which.

DESCRIPTION OF EXAMPLE EMBODIMENTS

Figure 1:
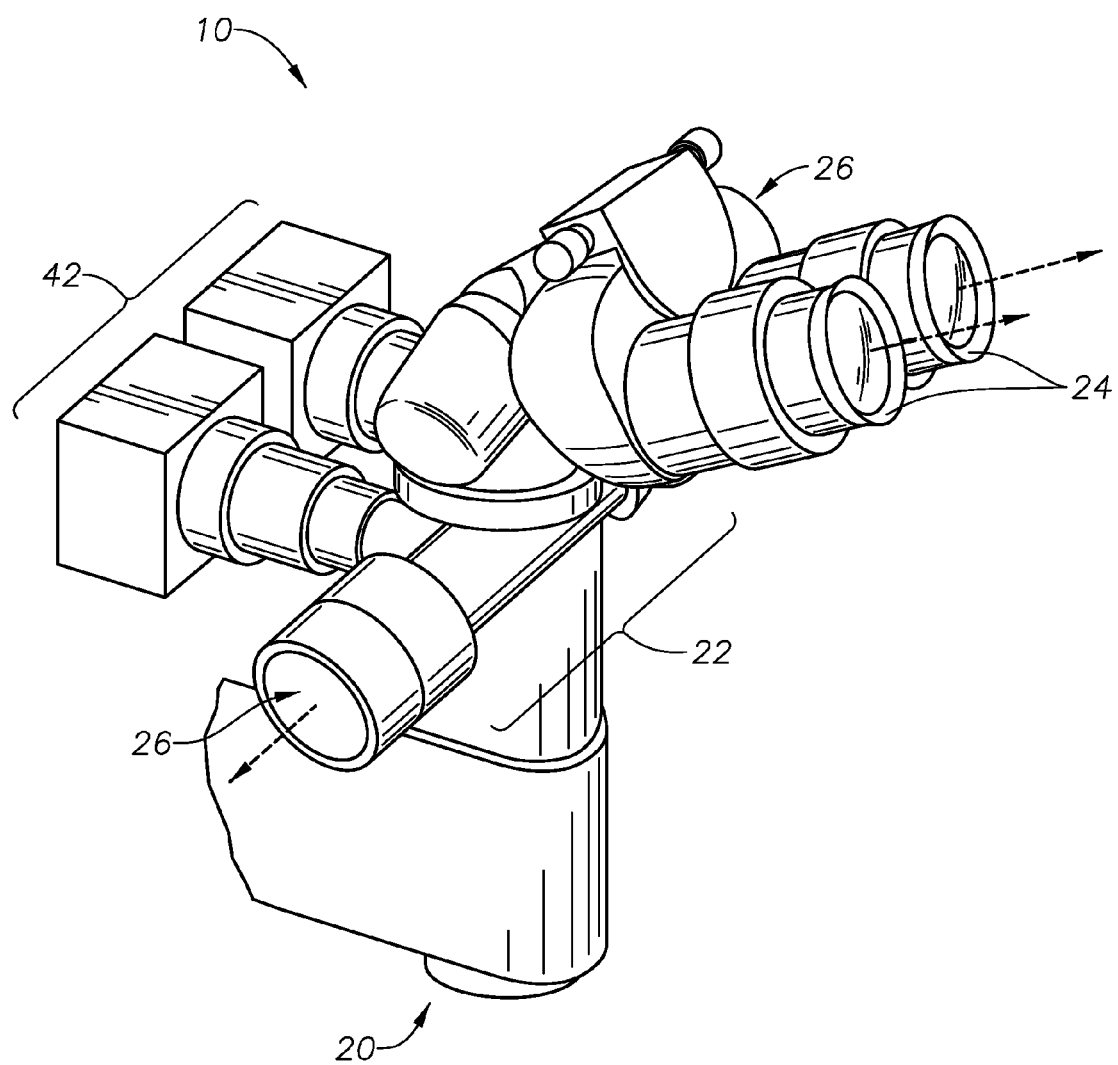
FIG. 1 illustrates an example of a microscope system that has a beam splitting system according to certain embodiments.

Referring now to the description and drawings, example embodiments of the disclosed apparatuses, systems, and methods are shown in detail. The description and drawings are not intended to be exhaustive or otherwise limit or restrict the claims to the specific embodiments shown in the drawings and disclosed in the description. Although the drawings represent possible embodiments, the drawings are not necessarily to scale and certain features may be exaggerated, removed, or partially sectioned to better illustrate the embodiments.

FIG. 1 illustrates an example of a microscope system 10 that has a beam splitting system 22. In the example, microscope system 10 includes an objective lens 20, a splitting system 22, one or more eyepieces 24, one or more ports 26, and an image system 42. Microscope system 10 may be any suitable microscope, such as a surgical ophthalmic optical microscope. An optical microscope includes one or more lenses that produce an enlarged image of a target placed in the focal plane of the microscope. The lenses may focus light from (e.g., emitted or reflected from) the target towards a detector (such as an eye). The lenses may include objective lens 20, which gathers light from the target and focuses the light beam to produce a real image.

A splitting system 22 may split the target light beam and/or combine the target light beam with another light beam. Examples of splitting systems 22 are described in more detail with reference to FIGS. 2 through 4. Splitting system 22 may send at least some light from the target to eyepieces 24, ports 26, and/or image system 42. Eyepieces 24 are located near the focal point of objective lens 20 to allow an observer to view an image of the target. Ports 26 may be used to couple devices that can receive the target light beam, e.g., one or more additional eyepieces for another observer or an image capture system.

In certain embodiments, image system 42 may be an image capture system that receives light beams from splitting system 22 and generates one or more images (such as a single image or a stream of images) of the target from the light beams. For example, the image capture system may be a video camera that generates video images of the target. In other embodiments, image system 42 may be an image display system that sends one or more images in an image beam to splitting system 22. For example, the image display system may be a light-emitting diode (LED) (e.g., organic LED) system that provides images that communicate information. Splitting system 22 may combine the image beam with target light beam to display the information and the target through the eyepieces 24, e.g., the informational image may be overlapped with the target image. Examples of information may include target information (e.g., patient data), temporal information (e.g., time or time elapsed), and instructional information (e.g., steps or next step). As an example, the instructional information may be a video feed from a remote instructor simulating the steps of a surgical procedure.

Figure 2:
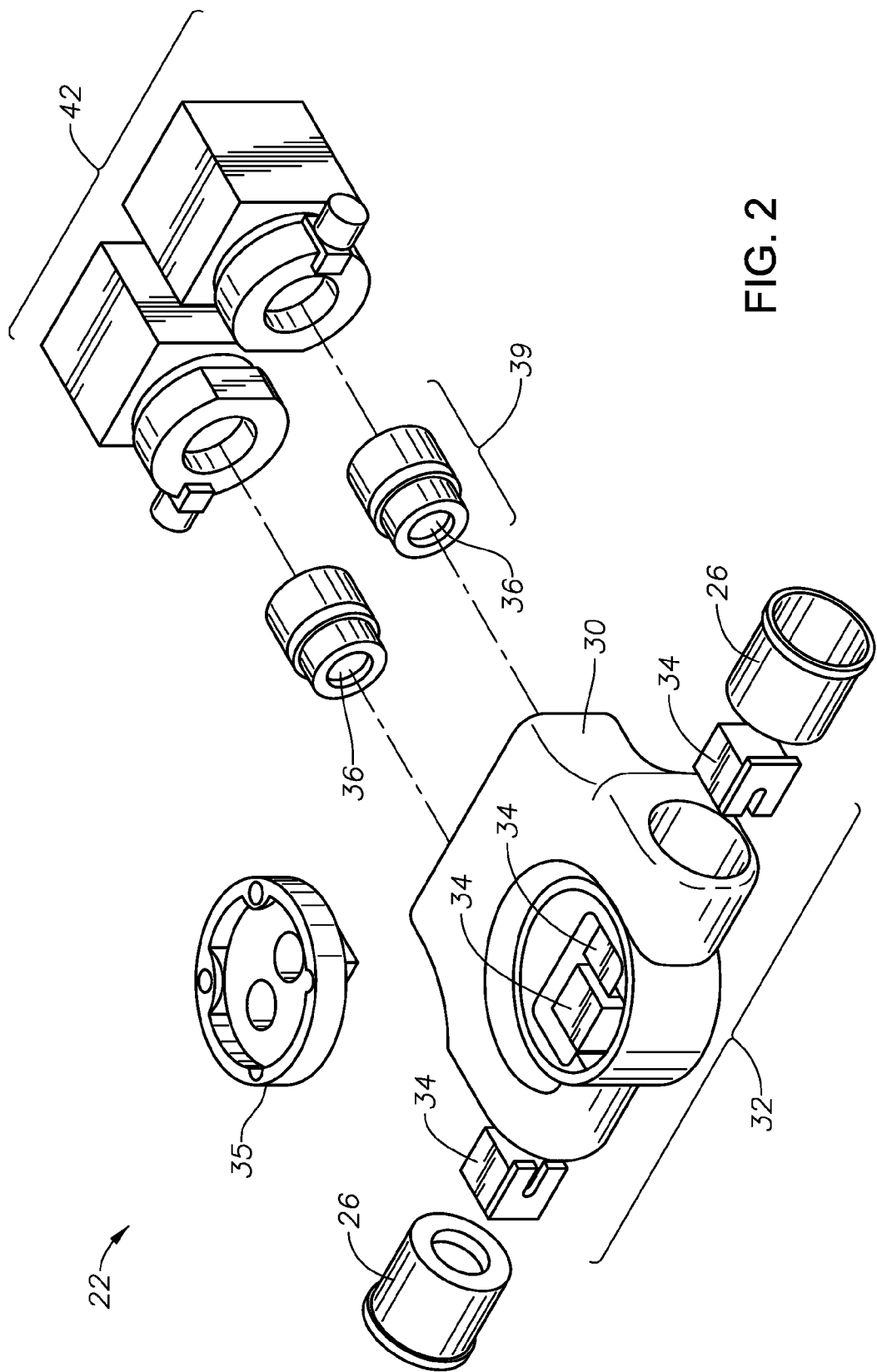
FIG. 2 illustrates an example of a beam splitting system that may be used with the microscope system of FIG. 1 according to certain embodiments.

FIG. 2 illustrates an example of a splitting system 22 that may be used with microscope system 10 of FIG. 1. In the example, splitting system 22 includes a beamsplitter system 32, one or more ports 26, lenses 36, a focusing assembly 39, and an image system 42. Beamsplitter system 32 comprises a housing 30, within which are disposed beamsplitter modules 34 and an optical spacer 35. Beamsplitter system 32 may send light beams to ports 26, through spacer 35 to eyepieces 24, and/or to image system 42. Beamsplitter system 32 is described in more detail with reference to FIG. 3. Lenses 36 direct light beams from beamsplitter modules 34 to image system 42 and/or from image system 42 to beamsplitter modules 34. Focusing assembly 39 focuses light beams from beamsplitter system 32.

Any suitable changes may be made to splitting system 22. In certain embodiments, one or more outputs may be replaced by one or more inputs, and/or one or more inputs may be replaced by one or more outputs. Different components, such as different input/output devices and/or beamsplitter modules 34, may be used to effect these changes. In other embodiments, different output and/or input devices may be used. For example, a video camera 42 of a channel may be replaced with a video display to create a heads up display in that channel. Other modifications may be made to implement the heads up display, e.g., replacing one prism 34 with a different type of prism and rotating the other prism 34.

Figure 3A:
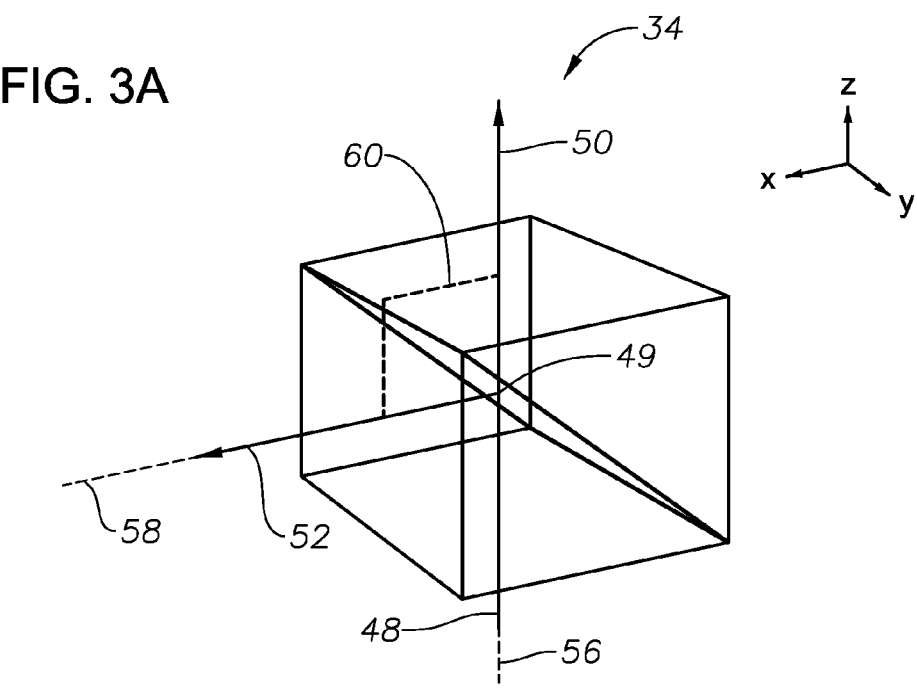
FIGS. 3A and 3B illustrate examples of beamsplitter modules that may be used in a beamsplitter system according to certain embodiments.
Figure 3B:
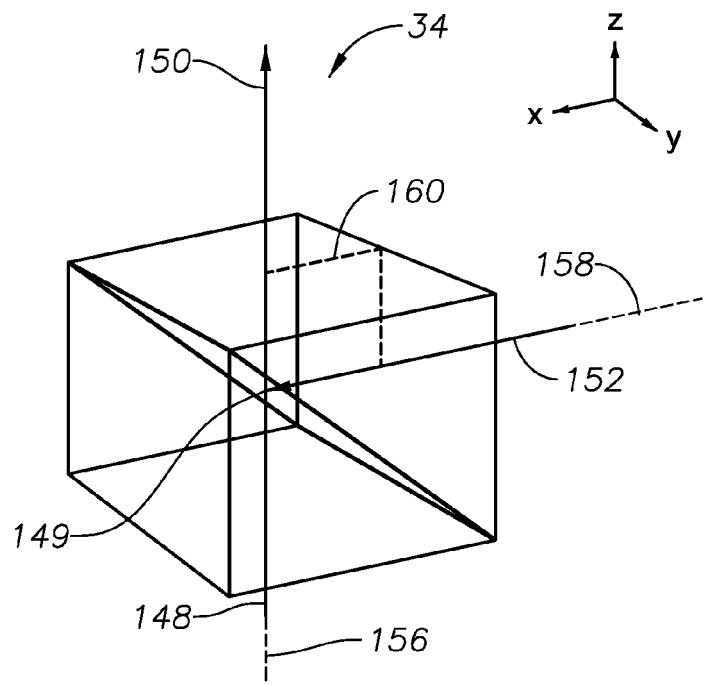

FIGS. 3A and 3B illustrate examples of beamsplitter modules 34 that may be used in a beamsplitter system 32. A beamsplitter module 34 may comprise one or more optical elements that operate to split and/or combine light beams. Examples of optical elements include lenses, mirrors, and prisms. In certain embodiments, a beamsplitter module 34 may be a cube beamsplitter comprising two cemented right angle prisms. The reflected and transmitted beams may travel through the same amount of glass, so although the optical path length of each arm is increased, both paths are increased by the same amount. A beamsplitter module 34 may have any suitable spectral range, e.g., a broadband visible, IR, or UV range or a narrow spectral range, which may be less than 50 nm wide, e.g., a 520 to 540 nm range.

FIG. 3A illustrates beamsplitter module 34 that receives an input light beam 48 and splits received beam 48 at a splitting region 49 to yield a plurality of output split beams 50, 52. In the example, split beam 50 may be regarded as a transmitted beam, and split beam 52 may be regarded as a reflected beam. The transmitted and reflected beams may constitute any suitable proportions of received beam 48. For example, the transmitted beam may be approximately 50% and the reflected beam may be approximately 50%, the transmitted beam may be less than 50% and the reflected beam may be greater than 50%, or the transmitted beam may be greater than 50% (e.g., approximately 70%) and the reflected beam may be less than 50% (e.g., approximately 30%).

The transmitted beam travels along a transmitted beam path 56 (which may be substantially the same optical path 56 as used by the received beam), and the reflected beam travels along a reflected beam optical path 58 that may be any suitable angle to the transmitted beam path 56. For example, the angle may be substantially 90°, less than 90°, or greater than 90°. The paths 56 and 58 may be regarded as defining an imaginary plane 60.

FIG. 3B illustrates beamsplitter module 34 that receives input light beams 148, 152 and combines beams 148, 152 at a combining region 149 to yield an output beam comprising combined beam 150. In the example, beam 148 may be regarded as a primary beam, and beam 152 may be regarded as a secondary beam. The primary and secondary beams may constitute any suitable proportions of combined beam 150. For example, the primary beam may be approximately 50% and the secondary beam may be approximately 50%, the primary beam may be less than 50% and the secondary beam may be greater than 50%, or the primary beam may be greater than 50% and the secondary beam may be less than 50%.

The primary beam travels along a primary beam path 156 (which may be substantially the same optical path 156 as used by the combined beam), and the secondary beam travels along a secondary beam path 158 that may be any suitable angle to the primary beam path 156. For example, the angle may be substantially 90°, less than 90°, or greater than 90°. The paths 156 and 158 may be regarded as defining an imaginary plane 160.

Regarding FIGS. 3A and 3B, in certain embodiments, two or more beamsplitter modules 34 may be aligned with each other. For example, the modules 34 may be aligned such that one or more of the following conditions are satisfied: (1) planes 60 are in substantially the same plane; and/or (2) an input beam path of one module 34 is substantially aligned with an output beam path of another module 34.

Figure 4:
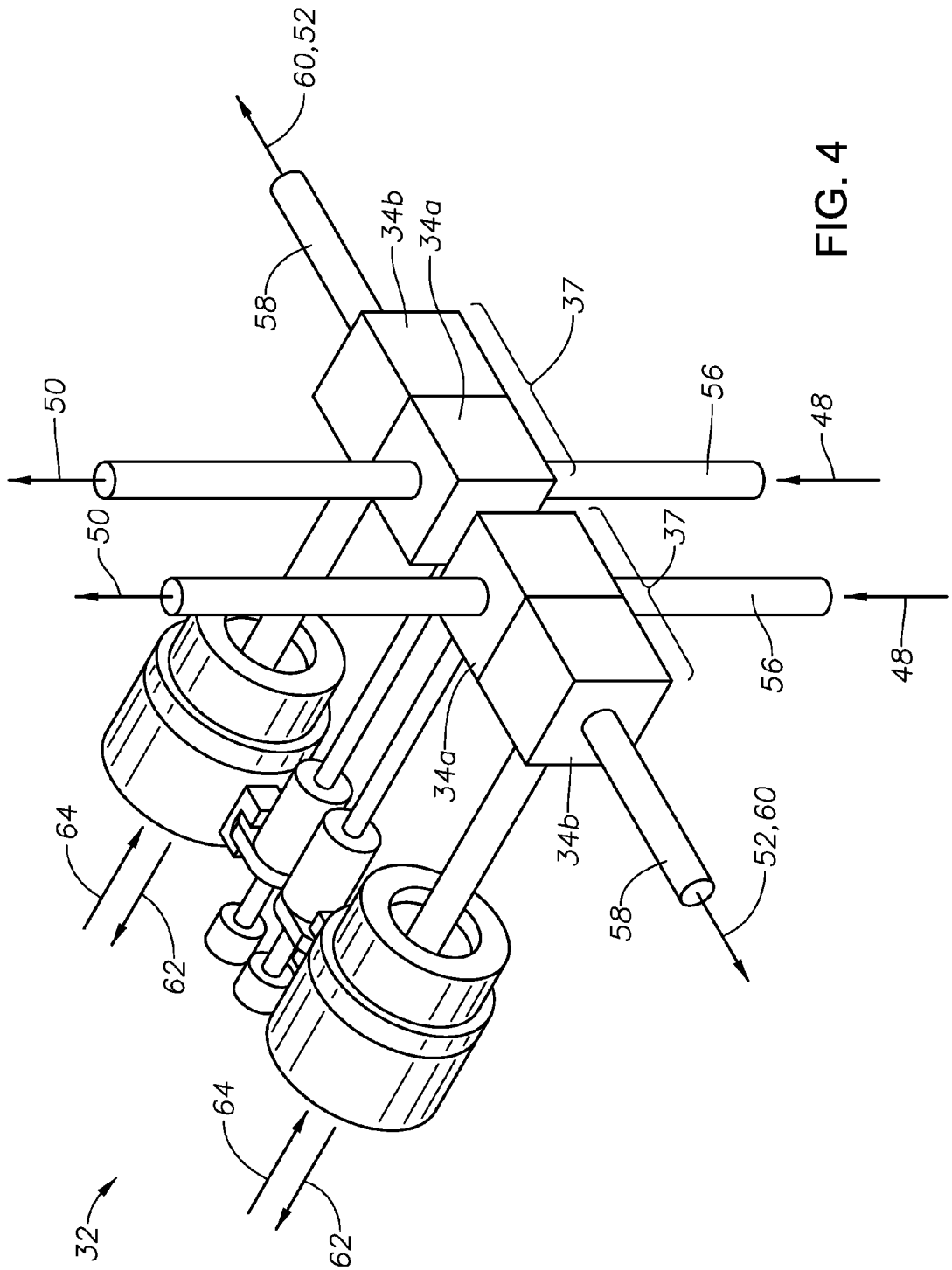
FIG. 4 illustrates an example of a beamsplitter system that may be utilized with the microscope system of FIG. 1 according to certain embodiments.

FIG. 4 illustrates an example of a beamsplitter system 32 that may be utilized in a microscope system. In the illustrated example, beamsplitter system 32 includes a plurality of beamsplitter sets 37. Each beamsplitter set 37 transmits a light beam to allow for stereoscopic imaging. Each beamsplitter set 37 comprises a first beamsplitter module 34a and a second beamsplitter module 34b aligned with the first beamsplitter module 34a. In certain embodiments, some or all of the beamsplitter modules 34a-b of the plurality of sets 37 are all aligned with each other.

In certain embodiments, first beamsplitter module 34a operates to split beams in a manner similar to that described with reference to FIG. 3A. First beamsplitter module 34a receives a first beam 48 traveling along a first optical path 56 and splits first beam 48 into a first output beam 50 transmitted along first optical path 56 and a first split beam directed to the second beamsplitter module 34b along a reflected beam path. In certain embodiments, first beamsplitter module 34a may receive first beam 48 from an objective lens and/or may send first output beam 50 to one or more eyepieces.

In certain embodiments, second beamsplitter module 34b operates to split beams in a manner similar to that described with reference to FIG. 3A. Second beamsplitter module 34b receives the first split beam from first beamsplitter module 34a and splits the first split beam into a second output beam 60 transmitted substantially parallel to reflected beam path 58 and a second split beam 62 transmitted substantially perpendicular to reflected beam path 58 and to optical path 56. Second beamsplitter module 34b may send second output beam 60 towards a port and/or may send second split beam 62 towards an image capture system.

In other embodiments, second beamsplitter module 34b operates to combine beams in a manner similar to that described with reference to FIG. 3B. Second beamsplitter module 34b receives the first split beam from first beamsplitter module 34a and transmits the first split beam substantially parallel to reflected beam path 58. Second beamsplitter module 34b also receives a second beam 64 (e.g., from an image display system) and transmits second beam 64 to first beamsplitter module 34a. First beamsplitter module 34b receives the second beam 64 and transmits the second beam 64 along the first optical path 56.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

Other modifications are possible without departing from the scope of the invention. For example, the description illustrates embodiments in particular practical applications, yet other applications will be apparent to those skilled in the art. In addition, future developments will occur in the arts discussed herein, and the disclosed systems, apparatuses, and methods will be utilized with such future developments.

The scope of the invention should not be determined with reference to the description. In accordance with patent statutes, the description explains and illustrates the principles and modes of operation of the invention using exemplary embodiments. The description enables others skilled in the art to utilize the systems, apparatuses, and methods in various embodiments and with various modifications, but should not be used to determine the scope of the invention.

The scope of the invention should be determined with reference to the claims and the full scope of equivalents to which the claims are entitled. All claims terms should be given their broadest reasonable constructions and their ordinary meanings as understood by those skilled in the art, unless an explicit indication to the contrary is made herein. For example, use of the singular articles such as "a," "the," etc. should be read to recite one or more of the indicated elements, unless a claim recites an explicit limitation to the contrary. As another example, "each" refers to each member of a set or each member of a subset of a set, where a set may include zero, one, or more than one element. In sum, the invention is capable of modification, and the scope of the invention should be determined, not with reference to the description, but with reference to the claims and their full scope of equivalents.

What is claimed is:

1. A system comprising:
a plurality of beamsplitter sets, each beamsplitter set comprising a first beamsplitter module and a second beamsplitter module aligned with the first beamsplitter module:
the first beamsplitter module configured to:
receive a first beam traveling along a first optical path; and
split the first beam into a first output beam transmitted along the first optical path and a first split beam transmitted to the second beamsplitter module along a reflected beam path;
the second beamsplitter module configured to:
receive the first split beam and transmit the first split beam substantially parallel to the reflected beam path line; and
receive a second beam and transmit the second beam to the first beamsplitter module; and
the first beamsplitter module further configured to:
receive the second beam and transmit the second beam along the first optical path.

2. The system of claim 1, the beamsplitter modules of the beamsplitter sets being aligned.

3. The system of claim 1, the first beamsplitter module configured to receive the first beam from an objective lens.

4. The system of claim 1, the first beamsplitter module configured to send the first output beam to one or more eyepieces.

5. The system of claim 1, the second beamsplitter module configured to send the first split beam to a port.

6. The system of claim 1, the second beamsplitter module configured to receive the second beam from an image display system.

7. A method comprising:
receiving a plurality of light beams at a plurality of beamsplitter sets, each beamsplitter set comprising a first beamsplitter module and a second beamsplitter module aligned with the first beamsplitter module;
receiving, at the first beamsplitter module, a first beam traveling along a first optical path;
splitting, by the first beamsplitter module, the first beam into a first output beam transmitted along the first optical path and a first split beam transmitted to the second beamsplitter module along a reflected beam path;
transmitting, by the second beamsplitter module, the first split beam substantially parallel to the reflected beam path line;
transmitting, by the second beamsplitter module, a second beam to the first beamsplitter module; and
transmitting, by the first beamsplitter module, the second beam along the first optical path.

8. The method of claim 7, further comprising:
receiving, at the first beamsplitter module, the first beam from an objective lens.

9. The method of claim 7, further comprising:
sending, by the first beamsplitter module, the first output beam to one or more eyepieces.

10. The method of claim 7, further comprising:
sending, by the second beamsplitter module, the first split beam to a port.

11. The method of claim 7, further comprising:
receiving, at the second beamsplitter module, the second beam from an image display system.

* * * * *